United States Patent
Swerdlow et al.

(10) Patent No.: US 9,483,801 B1
(45) Date of Patent: Nov. 1, 2016

(54) AUTOMATIC FADING OF ONLINE USER CONTENT

(75) Inventors: Andrew Swerdlow, San Francisco, CA (US); Dan Fredinburg, San Francisco, CA (US); Keith Patrick Enright, San Francisco, CA (US)

(73) Assignee: GOOGLE INC., Mountain View, CA (US)

( * ) Notice: Subject to any disclaimer, the term of this patent is extended or adjusted under 35 U.S.C. 154(b) by 301 days.

(21) Appl. No.: 13/550,004

(22) Filed: Jul. 16, 2012

(51) Int. Cl.
*G06Q 50/00* (2012.01)
*G06Q 10/10* (2012.01)
*G06Q 50/10* (2012.01)

(52) U.S. Cl.
CPC ............ *G06Q 50/01* (2013.01); *G06Q 10/107* (2013.01); *G06Q 50/10* (2013.01)

(58) Field of Classification Search
CPC combination set(s) only.
See application file for complete search history.

(56) References Cited

U.S. PATENT DOCUMENTS

| | | | | |
|---|---|---|---|---|
| 2005/0038533 A1* | 2/2005 | Farrell | ............ | G06F 17/30958 700/73 |
| 2008/0027909 A1* | 1/2008 | Gang | ............ | G06F 17/30873 |
| 2009/0144392 A1* | 6/2009 | Wang et al. | ............ | 709/217 |
| 2009/0216838 A1* | 8/2009 | Lee | ............ | 709/204 |
| 2011/0154223 A1* | 6/2011 | Whitnah et al. | ............ | 715/753 |
| 2012/0197996 A1* | 8/2012 | Raman et al. | ............ | 709/204 |
| 2013/0159519 A1* | 6/2013 | Hochberg | ............ | G06Q 50/01 709/225 |

* cited by examiner

*Primary Examiner* — Chris Parry
*Assistant Examiner* — Caroline Jahnige
(74) *Attorney, Agent, or Firm* — Procopio, Cory, Hargreaves & Savitch LLP

(57) ABSTRACT

Automatically fading online user content may include receiving digital content from a first user, the digital content associated with a first user-defined fading time indication; posting the digital content at a first time; associating, using the one or more computing devices, the first user-defined fading time indication with the digital content; receiving, at a second time, from a second user, a request to view the digital content, the second time being after the first time and the second user being distinct from the first user; determining the availability of the digital content based at least in part on the difference between the second time and the first time and the first user-defined fading time indication; and when the determined availability includes availability of one or more aspects of the digital content to the second user, providing for display to the second user the available one or more aspects.

20 Claims, 12 Drawing Sheets

AUTOMATIC FADING OF ONLINE USER CONTENT

BACKGROUND

1. Technical Field

The subject matter discussed herein relates generally to automatic fading of user attribution to online content in a social network and, more particularly, to automatic fading of online user content.

2. Background Information

An online user may post content such as a recommendation, a tag, a comment, a post, a video, an image, or data associated with an application (e.g., a high score for an online game application). This posted content of the user may be made available to others. For example, the posted content of the user may be made available to the online public, to all online users, or to a subset of commonly associated users (e.g., a circle of family members or friends).

After posting the content, the online user may determine that he or she does not want to be attributed to previously posted content. For example, the online user may not want the publicity or personalization associated with the posted online content.

The reasons for such a determination by the user may be associated with personal life events, such as graduating from school and interviewing for a job, but not wanting previous posts that may be critical of a potential employer to be attributed to the online user. As another example, a user may no longer wish to maintain attribution due to a time limitation on the usefulness of the comments (e.g., comments on a television show set to fade at the end of a season, comments on a sports team set to fade at the start of a new season, comments associated with an event (e.g., holiday party) set to fade after a few weeks or months, comments on school friends fade at some point after graduation)

On the other hand, the user may not want to disrupt the viewing of the content itself, but may only want to remove attribution. The online user can only manually delete the content. However, the online user cannot schedule a future removal of attribution, or remove attribution in a graduated or delayed manner.

Therefore, a solution is required without the foregoing limitations.

SUMMARY

A method of automatically fading online user content is described. The subject matter includes at least a computing device, a computer product, and a method for receiving, using one or more computing devices, digital content from a first user, wherein the digital content received from the first user is associated with a first user-defined fading time indication; posting, using the one or more computing devices, the digital content at a first time; associating, using the one or more computing devices, the first user-defined fading time indication with the digital content; receiving, using the one or more computing devices, at a second time, from a second user, a request to view the digital content, wherein the second time is after the first time, and wherein the second user is distinct from the first user; determining, using the one or more computing devices, the availability of the digital content based at least in part on the difference between the second time and the first time and the first user-defined fading time indication; and when the determined availability of the digital content includes availability of one or more aspects of the digital content to the second user, providing for display to the second user, using the one or more computing devices, the available one or more aspects of the digital content to the second user.

DETAILED DESCRIPTION

The subject matter described herein is taught by way of example embodiments.

Various details have been omitted for the sake of clarity and to avoid obscuring the subject matter. Examples shown below are directed to structures and functions for implementing automatic fading of online user content.

Overview

An online user may want his or her association with the online content to disappear. Thus, automatic fading of attribution of an online user to online content is provided. More specifically, according to an example embodiment, an online user may schedule a fading operation to be automatically performed in the future, after a prescribed amount of time has passed.

The automatic fading options and anonymization management may be separately determined by the user for various categories. For example, the user may set the above-discussed fade operation details for recommendations (e.g., +1), comments, posts, tags, videos, online game applications played, images, data associated with applications, or other category of online content.

Alternatively, the categories of content may include interests, hobbies, events, or other user-defined categories. For example, an inferred or explicit interest may be implemented as one or more of the categories of content. Such interests may relate to music, sports, films, or other category that an online user may wish to apply to correlate content. According to these user-defined categories of content, the online user may define the category based on an intended fading of content.

The foregoing example embodiments may be implemented in a user interface in conjunction with an "account settings" page, such that the settings are applied to all content that is created at any time after the user has set the fade options.

Alternatively, the fade options may be provided to the user at the time of the posting of the content. For example, a user may be provided with the fading options in a sharebox (e.g., interface in which sharing of content and the parameters of sharing are entered) when determining to share content with one or more other online users. Thus, the online user may set the fade at the time of the creation of individual online content posting.

Example User Interfaces

Figure 1A:
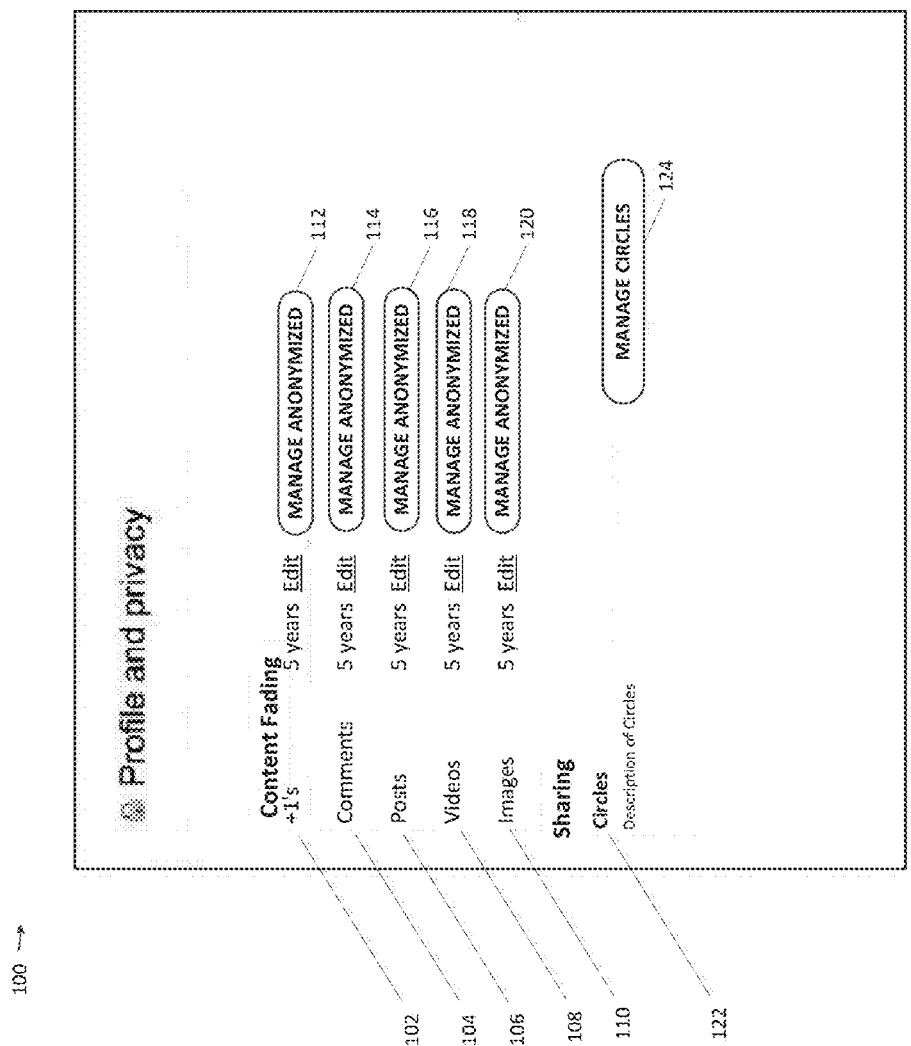
FIGS. 1A-1B illustrate a user interface according to an example embodiment.

FIG. 1A illustrates an example user interface 100 for "account settings". Under a "Profile and Privacy" setting, a "Content Fading" option is provided. Accordingly, for each of a plurality of the categories 102 . . . 110, a fade period is illustrated (e.g., five years), and a link to an "Edit" interface (not shown) is provided. A user may individually manage records for any of the categories 102 . . . 110 (e.g., predefined categories) by way of a "Manage Anonymized" option 112 . . . 120 that permits the user to create exceptions to set content fading parameters, as explained in greater detail below. The categories may include, but are not limited to, +1's, comments, posts, videos, images and other content categories as would be understood by one skilled in the art. Additionally, a "Sharing" option is provided that illustrates the circles 122 of the user. The circles may be managed by a "Manage Circles" option 124.

Figure 1B:
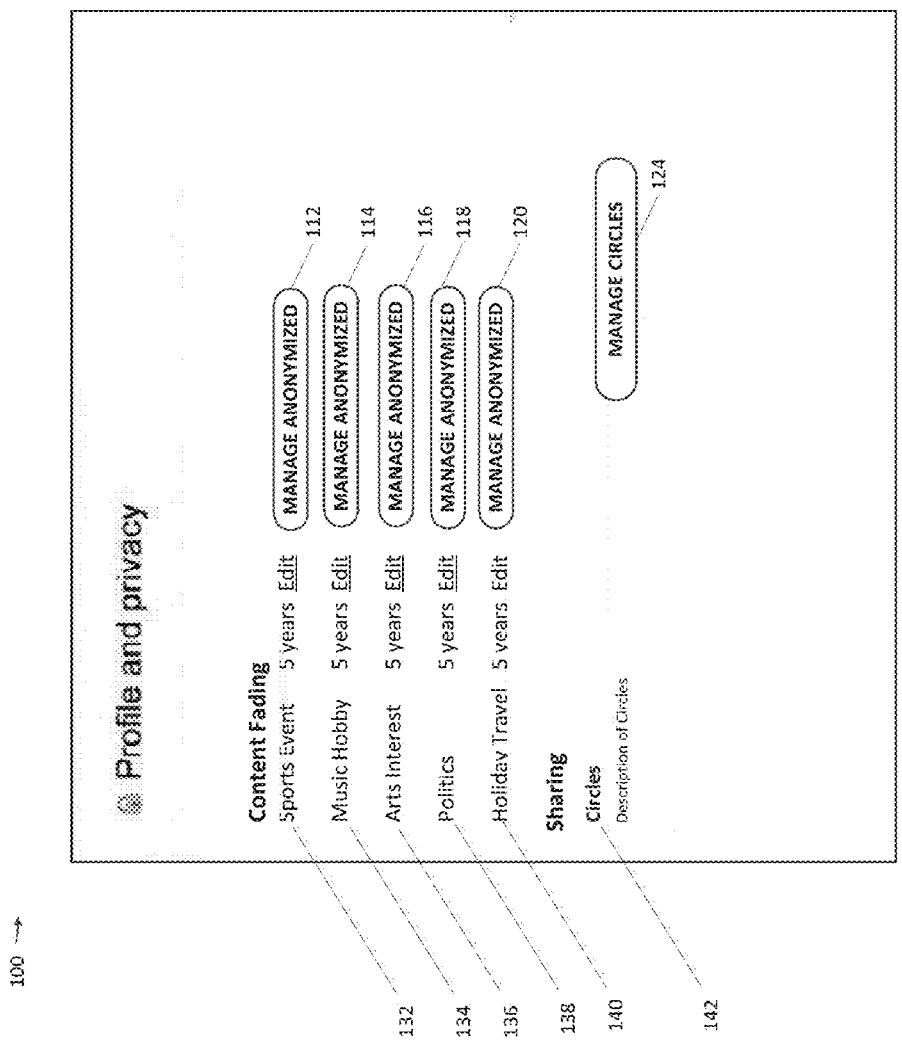

FIG. 1B illustrates another example user interface 100 for "account settings". Similar to FIG. 1A, under a "Profile and Privacy" setting, a "Content Fading" option is provided and a user may individually manage records for any of a plurality of user-defined categories 132 . . . 40 by way of a "Manage Anonymized" option 112 . . . 120 that permits the user to create exceptions to set content fading parameters, as explained in greater detail below. Additionally, for each of the plurality of user-defined categories 132 . . . 140, a fade period is illustrated (e.g., five years), and a link to an "Edit" interface (not shown) is provided. The categories may include, but are not limited to, events, such as a sports event 132; hobbies, such as music 134; interests, such as art 136; general topics of public interest, such as politics 138; and periodic events, such as a holiday vacation or holiday travel 140. Additionally, as with FIG. 1A, a "Sharing" option is provided that illustrates the circles 122 of the user, and the circles may be managed by a "Manage Circles" option 124.

Editing of Parameters

For example, the user may edit parameters, including the amount of time that must pass for the fading operation to be performed automatically, and the type of fading operation to be performed. These parameters may be edited prior to or after the posting of content, or alternatively, at the time that content is posted, as explained below.

In the example embodiment, the amount of the time that must pass for the fading operation to be formed have either the commencement of the rule or the time of the posting as the starting time. Other time periods may be substituted therefore, as would be understood by those skilled in the art.

In the example embodiment, the online user may select the type of fade operation as a full deletion of the attribution of the user to the content, as well as the content itself.

Alternatively, the user may select the type of fade operation as anonymizing the post by removing attribution to the online user of the content, without deleting the content itself. More specifically, the content remains available, while the online user is fully disassociated with the content. For example, the term "anonymous" may replace the user attribution when the content is displayed to other users, while the content remains available without modification.

Further, the online user may select the type of fade operation as only allowing certain online circles to view user attribution. For example, an online user may have attribution to content changed from being publicly available to only being viewable by a circle of online friends, or a circle of online family members.

Thus, an online user can control both the timing and the degree of the fade operation by editing the content fading parameters as discussed above.

Management of Anonymization

Additionally, anonymization may be managed by allowing an online user to view specific data, and set the automatic fade options for the specific data. For example, an online user can select a time period of one year and a fading operation that deletes the content.

However, the online user may use anonymization management to change the settings for specific data within the content category, such that a specific posting of content may have a different automatic fade option, or may be excluded from the fading parameters set for the online content by the user.

Thus, the online user can create exceptions to the fading rules for specific data within a category of data.

Example Variations of Content Fading

Additional variations on the foregoing example embodiments include staggering of the fade. For example, an online user may determine that the user attribution is being publicly available for two years from the posting of the content, and then becomes anonymous to the public, except for all online circles of which the user is a member. Within three years of the posting of the content, the anonymization is extended to one or more online circles of which the user is a member. Within five years from the posting of the content, the content is permanently deleted. As explained above, the fading may be based on content type or an online user-defined category.

According to the anonymization of user attribution as explained above, the fading to anonymization may be "reversed", so that user attribution is restored either immediately or after a time period has elapsed from the anonymization.

Optionally, a user may be provided with an interface such as a pop-up window that warns a user that a fade is about to occur. For example, the user may be prompted to confirm that he or she wishes for the fade action to occur.

In the foregoing example embodiments, the content of the posting is not modified as a part of the anonymization. Only the attribution to an online user is modified. Thus, the content of the posting itself continues to remain fully available, or is fully deleted. The actual content other than the attribution is not modified. However, the example embodiments are not limited to this particular implementation, and other variations of fading may be substituted therefore or combined there with, as would be understood by those skilled in the art.

Another example embodiment, the foregoing fading operation may also be applied to the fading of members or online circles. For example, after a time has elapsed since the last interaction with the circle by a member of the circle, the appearance of the member of the circle may change (e.g., shaded or different color).

Example Faded Interfaces

Figure 2:
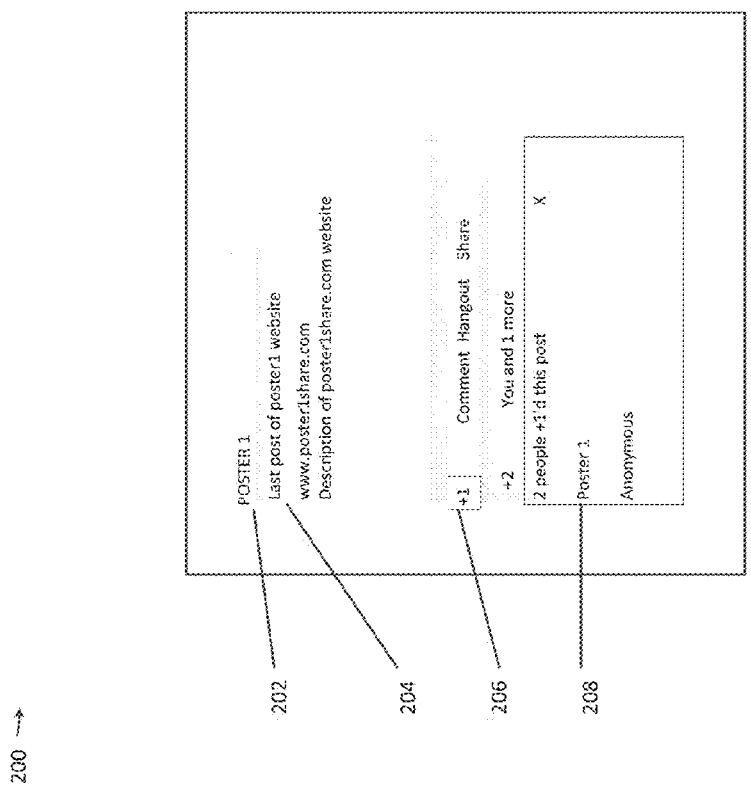
FIGS. 2-4 illustrate user interfaces illustrative showing one or more content fading operations according to an example embodiment.

FIG. 2 illustrates an example user interface of a faded attribution of a +1. According to this example user interface 200, a first user (e.g., Poster 1) 202 has posted a website and a description of a website 204. A set of options 206 are provided for any user (e.g., a second user) to +1, Comment, Hangout, Share, or otherwise provide online content with respect to the website 204 provided by the first user 202.

In this example user interface, at 208, it is shown that the post by the first user has been +1'd by two users (e.g., +2). The first user 202 has +1'd his or her own post as is identified as "Poster 1". Another user has +1'd his or her own post, and the attribution to the user has been faded to "Anonymous". Thus, the existence of the +1 itself is still visible, although the user attribution has been anonymized.

Figure 3:
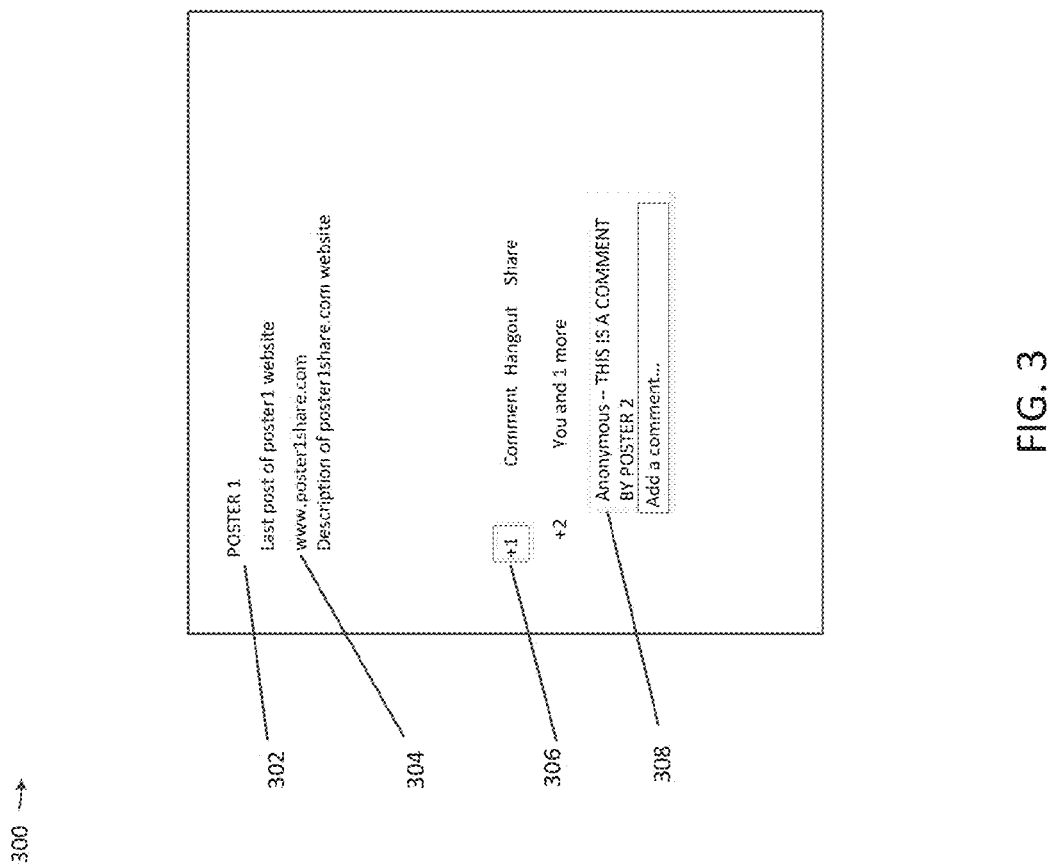

FIG. 3 illustrates an example user interface of a faded attribution of a comment. According to this example user interface 300, a first user (e.g., Poster 1) 302 has posted a website and a description of a website 304. A set of options 306 are provided for any user (e.g., a second user) to +1, Comment, Hangout, Share, or otherwise provide online content with respect to the website 304 provided by the first user 302.

In this example user interface, at 308, it is shown that the post by the first user has been +1'd by two users (e.g., +2). Additionally, a comment has been posted (e.g., "This is a comment by Poster 2") by a second user. The attribution of the comment to the second user has faded. More specifically, the term "Poster 2" has been replaced by "Anonymous" to indicate the fading of the user attribution. However, the content of the post itself does not fade in this example.

Figure 4:
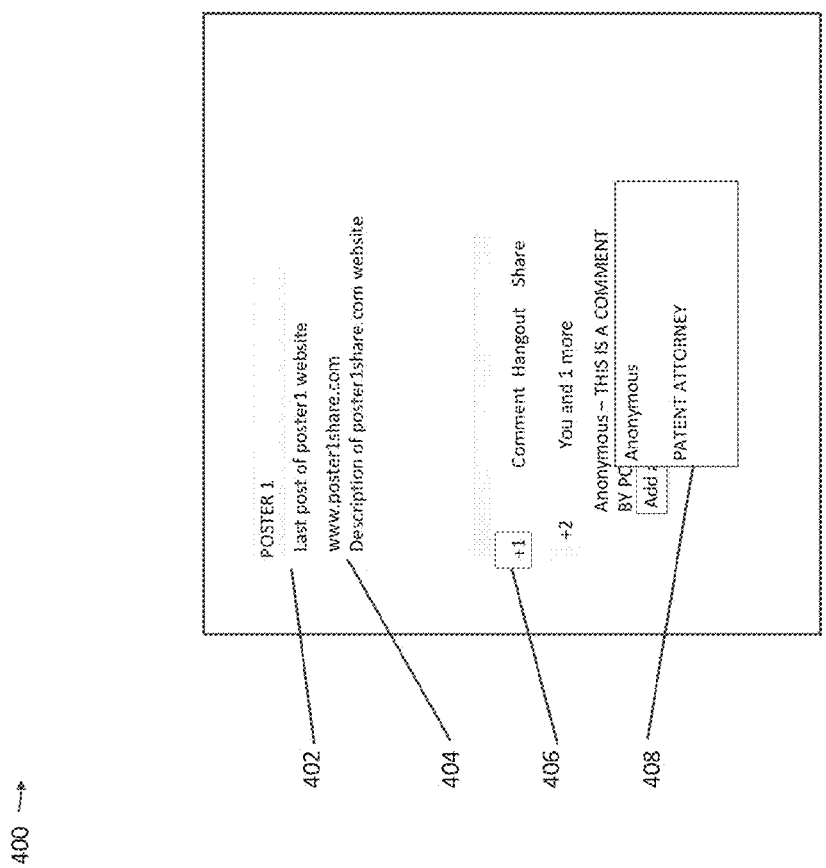

FIG. 4 illustrates an example user interface of a faded attribution of a comment. According to this example user interface 400, a first user (e.g., Poster 1) 402 has posted a website and a description of a website 304. A set of options 406 are provided for any user (e.g., a second user) to +1, Comment, Hangout, Share, or otherwise provide online content with respect to the website 404 provided by the first user 402.

In this example user interface, at 408, the term "Anonymous" has been selected, such that a user can attempt to obtain further information about the anonymous poster. Additionally, the comment posted by the second user remains, without attribution to the second user. Further, the user attribution that is provided when a user attempts to obtain further information about "Poster 2" continues to indicate the attribution as "Anonymous". However, the additional user information (e.g., "Patent Attorney") is not faded in this example user interface.

Process Overview

According to an example process, the user is provided with an interface that permits the user to set the fade parameters. As explained above, this interface may be provided at the time of the creation of the online content (e.g., sharebox), or may be created at a different time, as a part of an account settings process. In the account settings process, the user may have to select one or more content types the fade parameters are to be applied.

Once the user has determined to set the fade parameters, the user is presented within options for timing and type of fade operation, as explained above.

Once the fade parameters have been set, the content entered by the user for the particular type of content is identified for future fading. For example, the content may be identified by a flag setting, tagging or metadata associated with the content, or other identification as would be understood by those skilled in the art. Additionally, a process is performed, either continuously or in batch, that checks whether the fade time has expired.

When the fade time has expired, the fade operation is performed, as explained above. After the fade operation has been performed, user attribution to the content is modified as indicated by the fade parameters (e.g., deletion, anonymization, or limitation to online circles).

Thus, automatic fading of a user's association with content after a user-determined time period is performed.

Example Processes of Automatic Fading

Figure 5A:
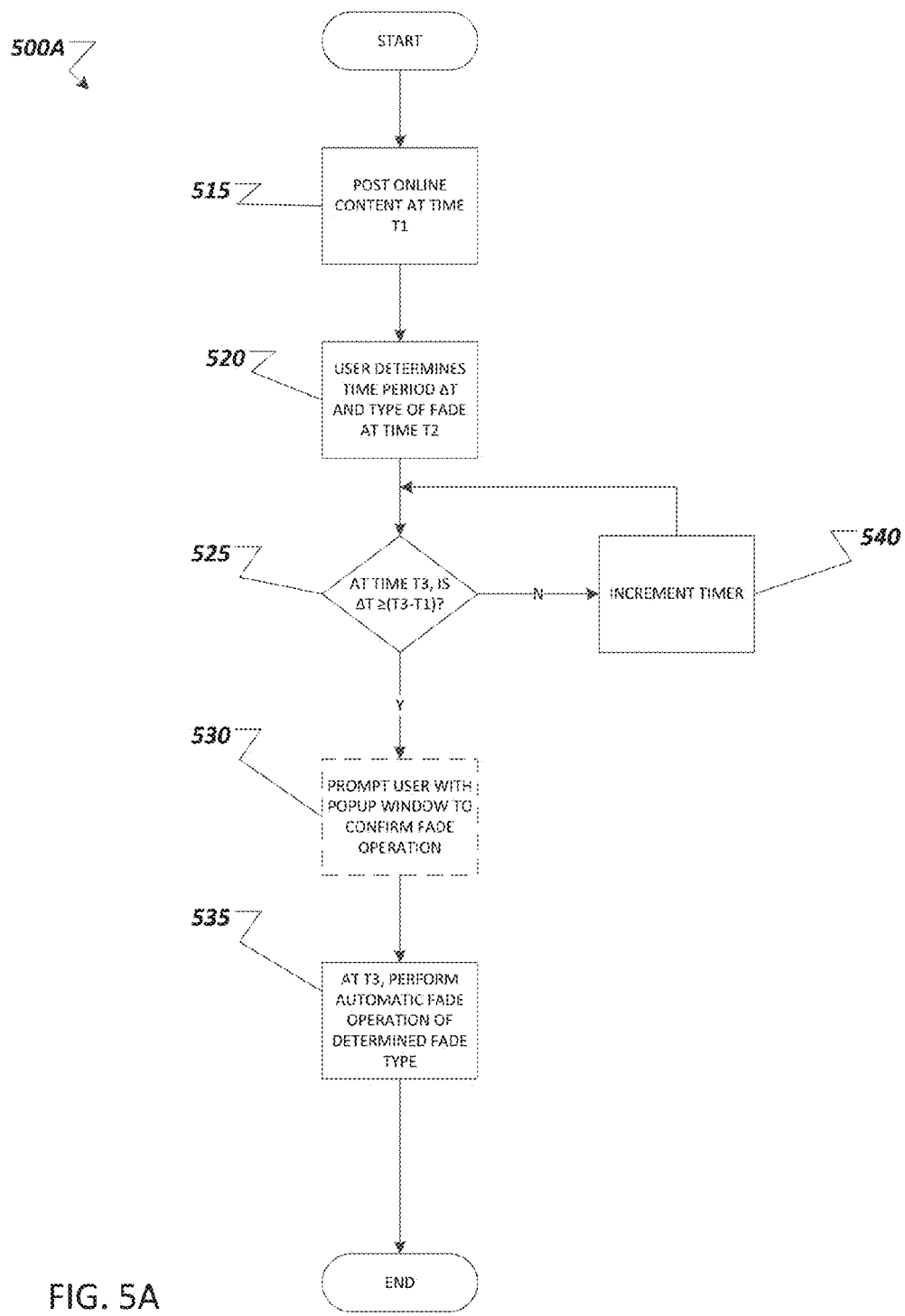
FIGS. 5A-5C illustrate example processes of a fading operation according to an example embodiment.
Figure 5B:
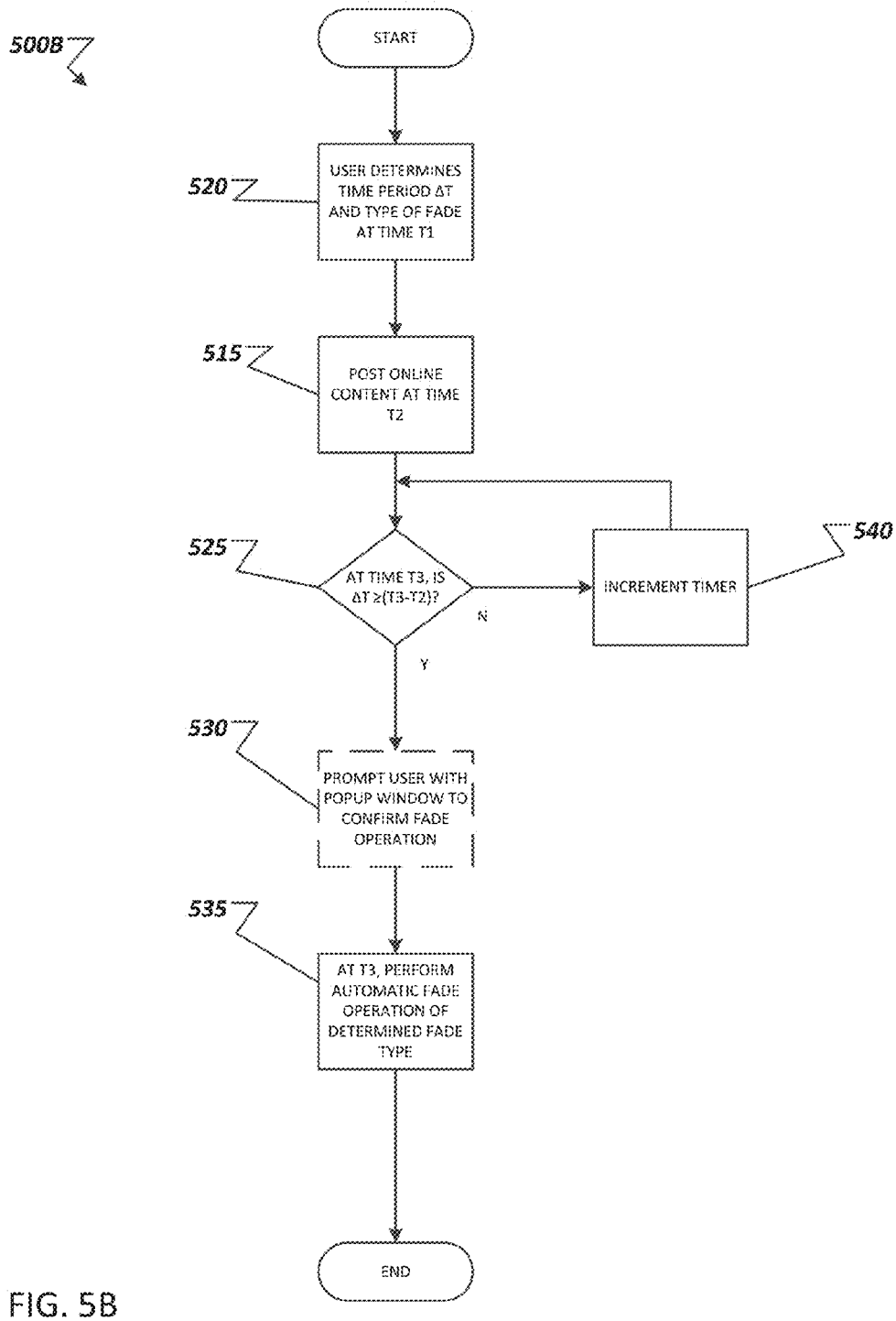
Figure 5C:
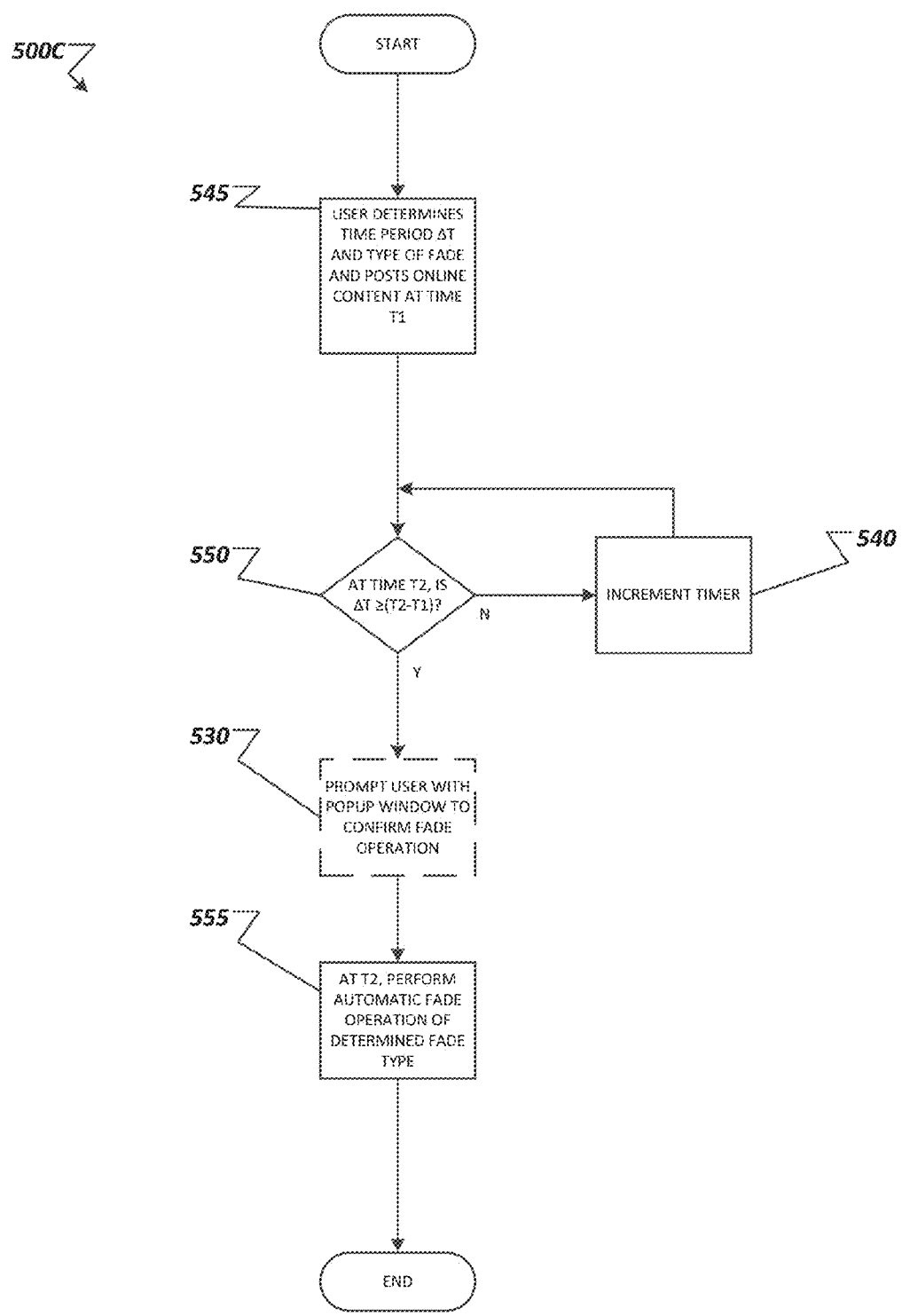

FIGS. 5A-5C show an example process implementing at least one example embodiment. More specifically, process 500A, 500B, and 500C are directed to example processes for performing a fading operation by a user.

As shown in block 515, a user may post online content at a first time (e.g., T1). At block 520, which occurs at a second time (e.g., T2), the user determines a time period ΔT and a type of fade. As explained above, the type of fade may include a complete deletion of the content and attribution, maintaining the content and anonymizing the attribution, and fading to a circle or circles. Thus, the user has posted his or her content before setting the parameters for content fading.

At block 525, a determination is made as to whether the time period for the fade has passed. For example, if the amount of time that has passed since the posting of content at time T1 exceeds the time period ΔT, it is determined that the time period has passed. If the time period has not passed, at block 540, a timer is incremented, and block 525 is repeated.

If the time period ΔT has passed, then at block 530, an optional display is provided to the user. More specifically, a user may be informed that his or her that the time period for fading has been met. Further, the user may be prompted to confirm fading of the content (e.g., pop-up window).

At block 535, the automatic fade operation is performed (e.g., executed), based on the type of fade operation selected in block 520. As explained above with respect to FIG. 1, the fade parameters may be edited, so as to change the time period ΔT or the type of fade. Further, anonymization may be managed in a manner that fades the content of selected content records in a manner that is independent of the parameters for the category of data. Once the fade operation has been performed, the content and/or attribution is modified or deleted, as explained above.

FIG. 5B illustrates an alternate example process. The description of like reference numerals is omitted for the sake of clarity. In FIG. 5B, the process 500B is different from the process 500A illustrated in FIG. 5A due to the user determination of a time period ΔT and a type of fade at block 520, prior to the posting of the online content at time T2 in block 515. Thus, the user has posted his or her content after setting the parameters for content fading.

In some examples, processes 500A-C, 600 and 700A-B may be implemented with different, fewer, or more blocks. Process processes 500A-C, 600 and 700A-B may be implemented as computer executable instructions, which can be stored on a medium, loaded onto one or more processors of one or more computing devices, and executed as a computer-implemented method.

FIG. 5C illustrates an alternate example process. In the process 500C, a user determines the parameters of the fade operation at the time of posting of content. At block 545, a user determines a time period ΔT and a type of fade, and posts online content, at a first time T1. For example, but not by way of limitation, a user may be provided with an option to edit fade parameters for the content to be shared in a sharebox at the time of posting content, as explained above.

At block 550, at time T2 is it determined whether the time period ΔT for the fade has passed (e.g., is the difference between the current time T2 and the time of posting and determining fade parameters T1 greater than or equal to the time period ΔT. The execution of blocks 530, 540 and 555 is substantially the same as described above with respect to FIGS. 5A and 5B. Therefore, the description of these blocks is omitted from the discussion of FIG. 5C.

Figure 6:
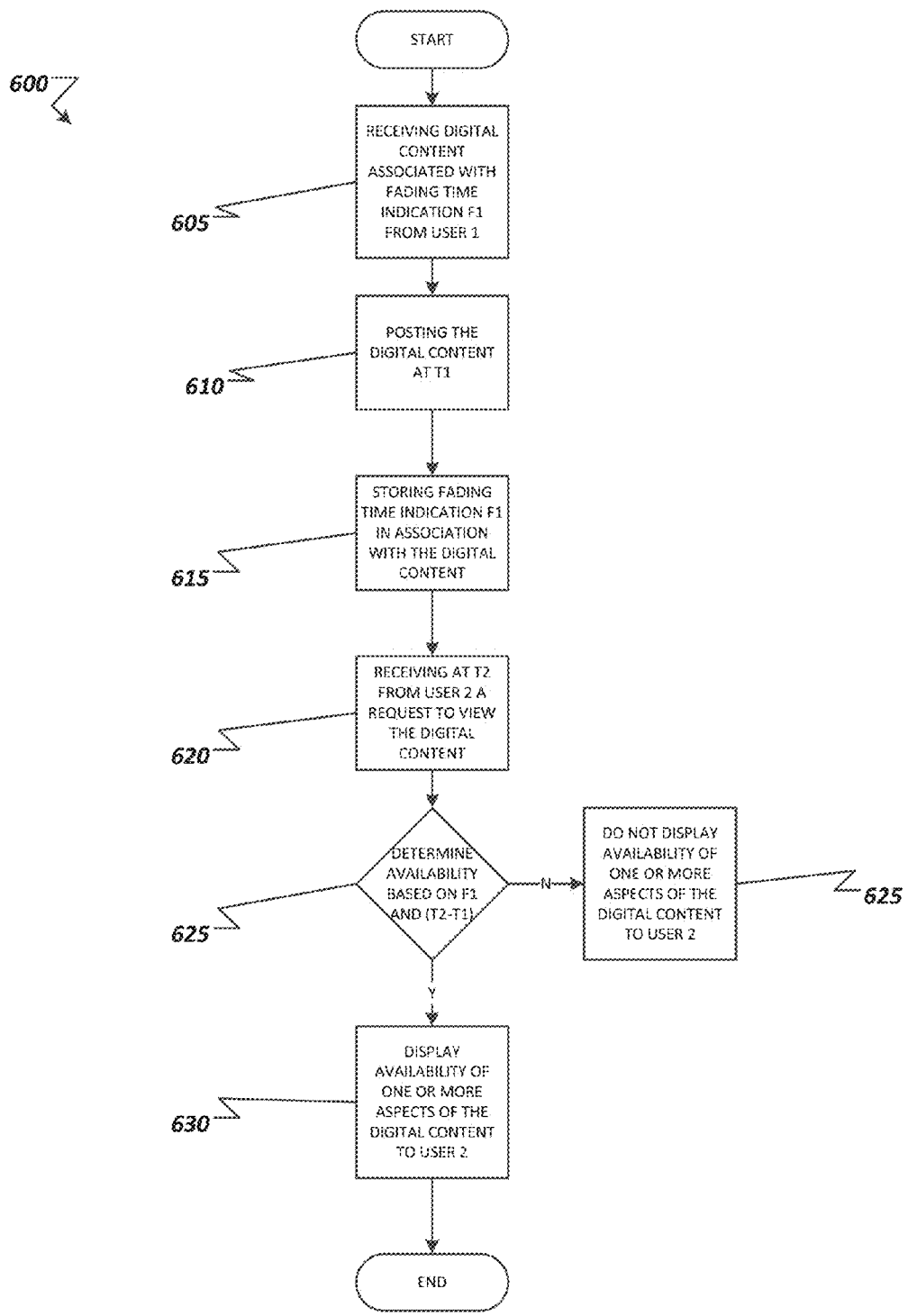
FIG. 6 illustrates another example process of a fading according to an example embodiment.

FIG. 6 illustrates another example process 600 for automatically fading online content. At block 605, a first user (e.g., user 1) provides digital content that is associated with a first user-defined fading time indication F1. At block 610, the online digital content is posted at a first time (e.g., T1).

At block 615, the first user-defined fading time indication F1 associated with the digital content is stored.

At block 620, a request is received from a second user (e.g., user 2), distinct from the first user (e.g., user 1), to view the digital content, at a second time (e.g., T2) that is after the first time T1. At block 625, a determination is made as to the availability of the content. For example, but not by way of limitation, this determination may be based, at least in part, on a difference between the second time T2 and the first time T1, and the first user-defined fading time indication F1.

If the determination is negative at block 625, the digital content is faded. Accordingly, at block 625, the digital content is either deleted and thus not available, or displayed without user attribution to the second user (e.g., user 2). For example, the second user may be able to view the content but not the user attribution. Alternatively, only users in certain circles may be able to view the user attribution with the content, whereas users not in the certain circles can only view the content, but not the user attribution.

If the determination is positive at block 625, the digital content is available. Accordingly, at block 630, the digital content is displayed to the second user (e.g., user 2). For example, the second user may be able to view the content as well as the user attribution.

Example Processes of Editing Parameters and Managing Anonymization

Figure 7A:
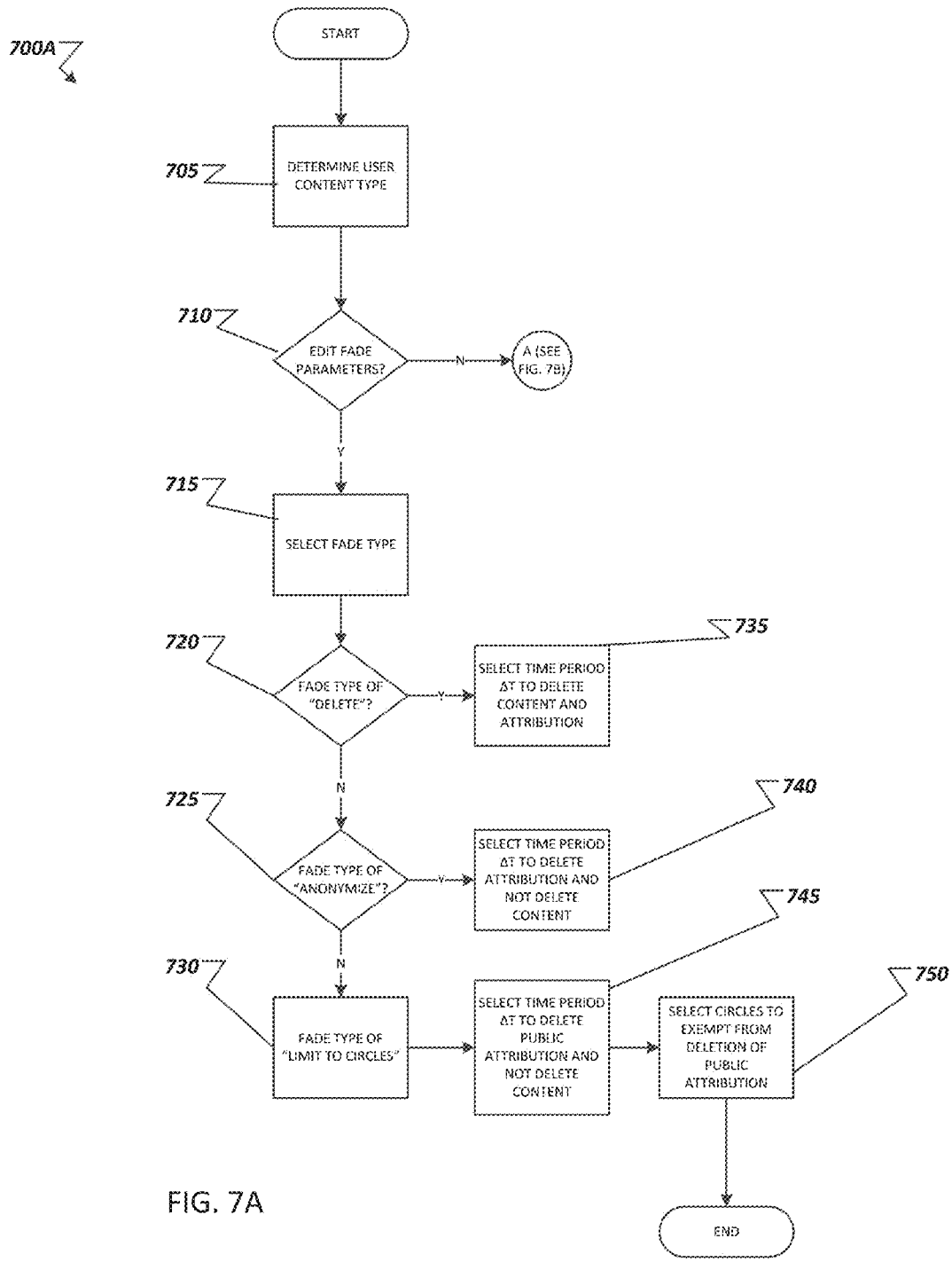
FIGS. 7A-7B illustrate example processes of editing one or more fade parameters and managing anonymization according to an example embodiment.
Figure 7B:
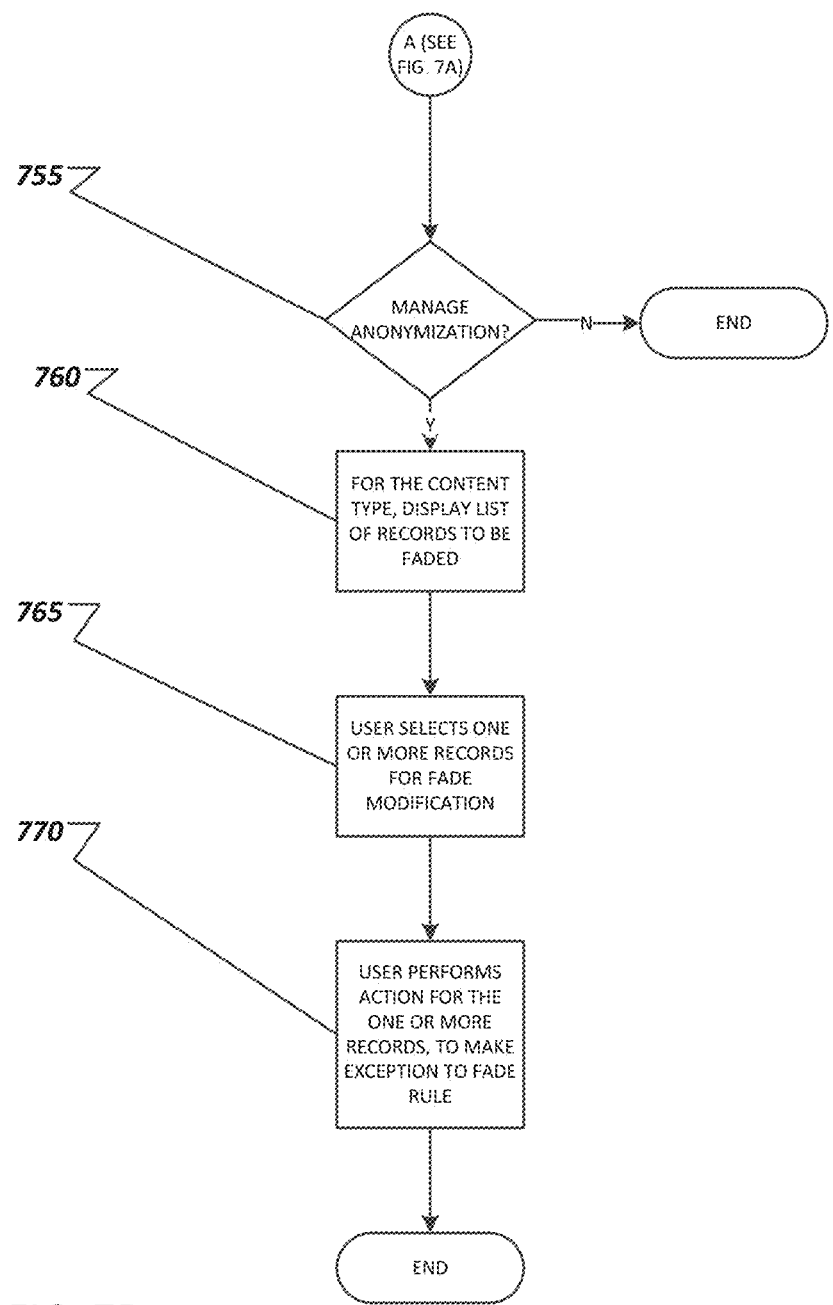

FIGS. 7A-7B illustrate example processes 700A, 700B of editing one or more fade parameters and managing anonymization according to an example embodiment. At block 705, a user content type is determined (e.g., selected) by a user. As explained above, the content categories may be predefined or based on a type of content, as depicted in FIG. 1A, or alternatively, may be based on categories defined by an online user as explained above and depicted with respect to FIG. 1B. The user may determine whether to edit fade parameters at block 710. If the user determines to edit fade parameters, then at "A", the process flows to process 700B at FIG. 7B.

If the user determines to not edit fade parameters at block 710, then at block 715, the user selects a fade type. If the selected fade type is determined to be "delete" at block 720, then at block 735, the user selects a time period ΔT to delete content and user attribution.

If the selected fade type is not "delete" at block 720, at block 725, it is determined whether the selected fade type is "anonymize". If so, at block 740 the user selects a time period ΔT to delete user attribution but to not delete the content itself (e.g., anonymize).

If the selected fade type is not "anonymize" at block 725, then the fade type is limited to circles, as shown at block 730. Accordingly, at block 745, a user selects a time period ΔT to delete public attribution of the user to the posted online content, and to not delete the content. At block 750, the user selects circles (e.g., commonly grouped users such as family, friends or coworkers) to exempt from the deletion of user attribution of block 745.

As explained above, if the user determines to not edit fade parameters, then at "A", the process flows to process 700B at FIG. 7B. At block 755, a determination is made as to whether to manage anonymization. The management of anonymization is disclosed above.

If a determination is made to manage anonymization at block 755 (e.g., selection of elements 112-120 of FIG. 1), at block 760, a list of records to be faded for the user content type is displayed. At block 765, a user selects one or more records for modification of fade settings. For example, a user may select one or more records of a post, an image, a video, a +1, or other type of content such as a user-defined category, dependent on the type of user content selected. At block 770, the user performs action for the one or more records, to except the one or more records from the fade rule for the selected type of user content. For example, a user may determine to not fade certain images associated with an event, due to a desire to maintain user attribution.

Example Computing Devices and Environments

Figure 8:
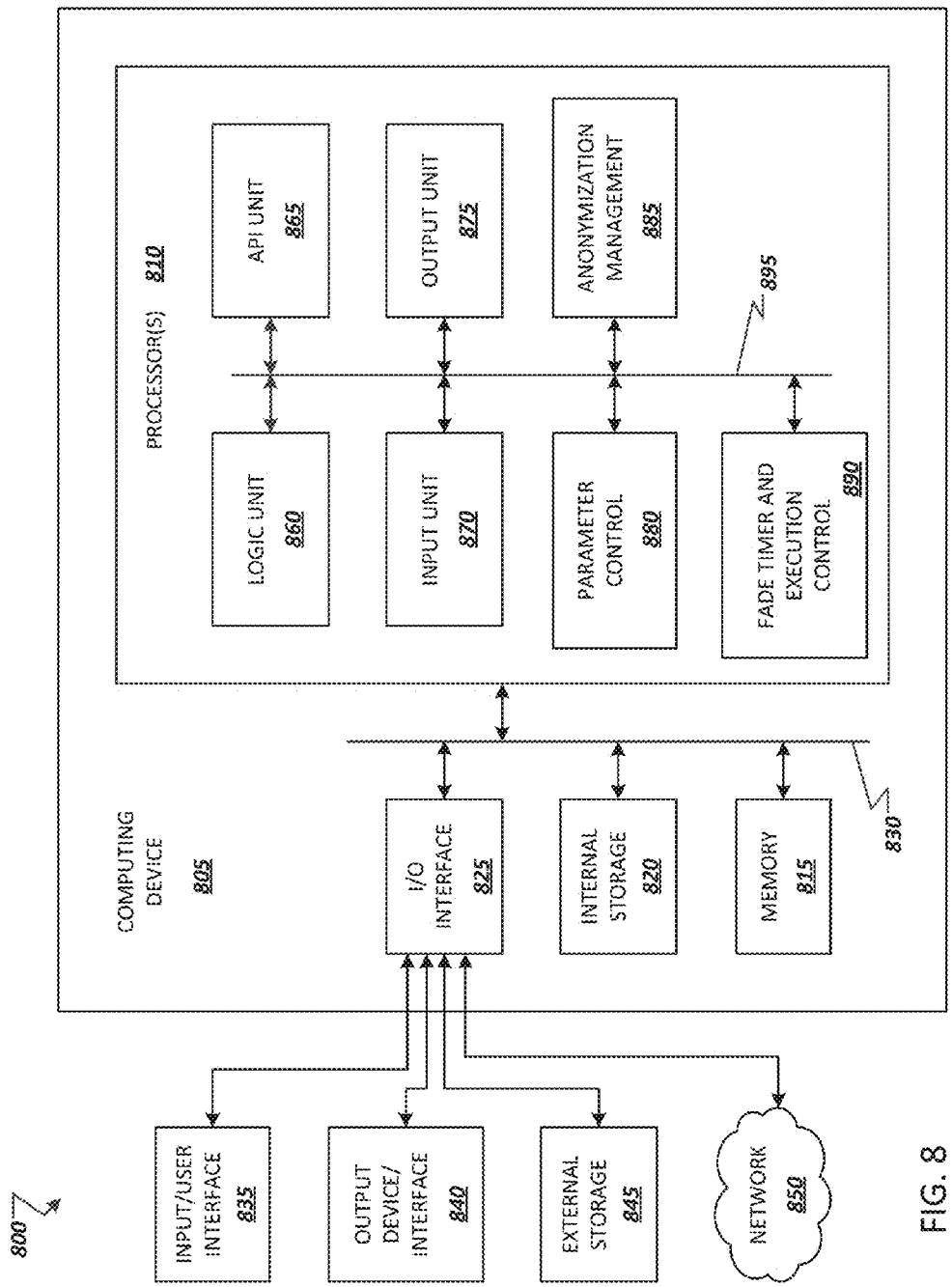
FIG. 8 illustrates an example hardware configuration.

FIG. 8 shows an example computing environment with an example computing device suitable for implementing at least one example embodiment. Computing device 805 in computing environment 800 can include one or more processing units, cores, or processors 810, memory 815 (e.g., RAM, ROM, and/or the like), internal storage 820 (e.g., magnetic, optical, solid state storage, and/or organic), and/or I/O interface 825, any of which can be coupled on a communication mechanism or bus 830 for communicating information or embedded in the computing device 805.

Computing device 805 can be communicatively coupled to input/user interface 835 and output device/interface 840. Either one or both of input/user interface 835 and output device/interface 840 can be a wired or wireless interface and can be detachable. Input/user interface 835 may include any device, component, sensor, or interface, physical or virtual, that can be used to provide input (e.g., buttons, touch-screen interface, keyboard, a pointing/cursor control, microphone, camera, braille, motion sensor, optical reader, and/or the like). Output device/interface 840 may include a display, television, monitor, printer, speaker, braille, or the like. In some example embodiments, input/user interface 835 and output device/interface 840 can be embedded with or physically coupled to the computing device 805. In other example embodiments, other computing devices may function as or provide the functions of input/user interface 835 and output device/interface 840 for a computing device 805.

Examples of computing device 805 may include, but are not limited to, highly mobile devices (e.g., smartphones, devices in vehicles and other machines, devices carried by humans and animals, and the like), mobile devices (e.g., tablets, notebooks, laptops, personal computers, portable televisions, radios, and the like), and devices not designed for mobility (e.g., desktop computers, other computers, information kiosks, televisions with one or more processors embedded therein and/or coupled thereto, radios, and the like).

Computing device 805 can be communicatively coupled (e.g., via I/O interface 825) to external storage 845 and network 850 for communicating with any number of networked components, devices, and systems, including one or more computing devices of the same or different configuration. Computing device 805 or any connected computing device can be functioning as, providing services of, or referred to as a server, client, thin server, general machine, special-purpose machine, or another label.

I/O interface 825 can include, but is not limited to, wired and/or wireless interfaces using any communication or I/O protocols or standards (e.g., Ethernet, 802.11x, Universal System Bus, WiMax, modem, a cellular network protocol, and the like) for communicating information to and/or from at least all the connected components, devices, and network in computing environment 800. Network 850 can be any network or combination of networks (e.g., the Internet, local area network, wide area network, a telephonic network, a cellular network, satellite network, and the like).

Computing device 805 can use and/or communicate using computer-usable or computer-readable media, including transitory media and non-transitory media. Transitory media include transmission media (e.g., metal cables, fiber optics), signals, carrier waves, and the like. Non-transitory media include magnetic media (e.g., disks and tapes), optical media (e.g., CD ROM, digital video disks, Blu-ray disks), solid state media (e.g., RAM, ROM, flash memory, solid-state storage), and other non-volatile storage or memory.

Computing device 805 can be used to implement techniques, methods, applications, processes, or computer-executable instructions to implement at least one embodiment (e.g., a described embodiment). Computer-executable instructions can be retrieved from transitory media, and stored on and retrieved from non-transitory media. The executable instructions can be originated from one or more of any programming, scripting, and machine languages (e.g., C, C++, C#, Java, Visual Basic, Python, Perl, JavaScript, and others).

Processor(s) 810 can execute under any operating system (OS) (not shown), in a native or virtual environment. To implement a described embodiment, one or more applications can be deployed that include logic unit 860, application programming interface (API) unit 865, input unit 870, output unit 875, parameter control 880, anonymization management 885, fade timer and execution control 890, and inter-unit communication mechanism 895 for the different units to communicate with each other, with the OS, and with other applications (not shown). For example, parameter control 880, anonymization management 885, and fade timer and execution control 890 may implement one or more processes shown in FIGS. 5A-C, 6A-B and 7. The described units and elements can be varied in design, function, configuration, or implementation and are not limited to the descriptions provided.

In some example embodiments, when information or an execution instruction is received by API unit 865, it may be communicated to one or more other units (e.g., logic unit 860, input unit 870, output unit 875, parameter control 880, anonymization management 885, and fade timer and execution control 890). For example, parameter control 880 may receive information from the input unit 870 to determine parameter information such as a time period and a type of fade, anonymization management 885 may receive input from the input unit 870 to provide for exceptions to the parameters set for the content type, and fade timer and execution control 890 may change the availability of the content and/or user attribution of the content, after input unit 870 has detected a user indication or feedback, input unit 870 may use API unit 865 to communicate the user indication to parameter control 880. Feedback management unit 880 may, via API unit 865, interact with the anonymization management 885 to detect and process a comment. Using API unit 865, parameter control 880 may interact with fade timer and execution control 890 to determine whether to propagate the feedback and/or identify information to an upstream post.

In some examples, logic unit 860 may be configured to control the information flow among the units and direct the services provided by API unit 865, input unit 870, output unit 875, parameter control 880, anonymization management 885, and fade timer and execution control 890 in order to implement an embodiment described above. For example, the flow of one or more processes or implementations may be controlled by logic unit 860 alone or in conjunction with API unit 865.

Although a few example embodiments have been shown and described, these example embodiments are provided to convey the subject matter described herein to people who are familiar with this field. It should be understood that the subject matter described herein may be embodied in various forms without being limited to the described example embodiments. The subject matter described herein can be practiced without those specifically defined or described matters or with other or different elements or matters not described. It will be appreciated by those familiar with this field that changes may be made in these example embodiments without departing from the subject matter described herein as defined in the appended claims and their equivalents.

What is claimed is:

1. A computer-implemented method of automatically fading online user content, comprising:

receiving, using one or more computing devices, digital content from a first user, wherein the digital content received from the first user is associated with a first user-defined fading time indication to fade attribution information associated with the digital content and not fade the digital content, and at least one user-defined category;

posting, using the one or more computing devices, the digital content and the attribution information at a first time;

associating, using the one or more computing devices, the first user-defined fading time indication with the attribution information, wherein the associating comprises storing the first user-defined fading time indication including a time period and a first determination that the digital content available to a second user does not include the attribution information of the first user to the digital content, so as to make authorship of the digital content anonymous to the second user;

receiving, using the one or more computing devices, at a second time, from the second user, a request to view the digital content, wherein the second time is after the first time, and wherein the second user is distinct from the first user;

determining, using the one or more computing devices, the availability of the digital content and the attribution information based on a difference between the second time and the first time with respect to the first user-defined fading time indication, and the at least one user-defined category; and automatically providing for display to the second user, using the one or more computing devices, the available digital content for the at least one user-defined category without providing the attribution information of the first user that is associated with the digital content for the at least one user-defined category, so as to make authorship of the digital content anonymous to the second user.

2. The computer-implemented method of claim 1, wherein the time period comprises one of an amount of time after the determination of the first user-defined fading time indication by the first user, and an amount of time after the posting of the digital content by the first user at the first time.

3. The computer-implemented method of claim 2, wherein the first user determines the time period and a type of the automatic fading for a content category to which the posted digital content belongs.

4. The computer-implemented method of claim 2, further comprising providing the first user with an option to set the first determination, a second determination that the attribution information is not available to the second user, and a third determination that the attribution information of the first user to the digital content is available to only a circle of users that includes the second user.

5. The computer-implemented method of claim 1, further comprising generating a display to the user that prompts the first user to confirm the determined availability of the digital content in response to a request received from the second user for the display of the digital content, after posting of the digital content, while maintaining the authorship of the digital content as anonymous.

6. The computer-implemented method of claim 1, wherein the online user content is categorized based on at least one of a recommendation, a post, a comment, a video, data associated with an online application, an image, and a video.

7. The computer-implemented method of claim 1, wherein the first-defined fading time indication is determined by the first user one of concurrently with and after the posting of the digital content.

8. A non-transitory computer readable medium having stored therein computer
executable instructions for:
receiving, using one or more computing devices, digital content from a first user, wherein the digital content received from the first user is associated with a first user-defined fading time indication to fade attribution information associated with the digital content and not fade the digital content, and at least one user-defined category;
posting, using the one or more computing devices, the digital content and the attribution information at a first time;
associating, using the one or more computing devices, the first user-defined fading time indication with the attribution information, wherein the associating comprises storing the first user-defined fading time indication including a time period and a first determination that the digital content available to a second user does not include the attribution information of the first user to the digital content so as to make authorship of the digital content anonymous to the second user;
receiving, using the one or more computing devices, at a second time, from the second user, a request to view the digital content, wherein the second time is after the first time, and
wherein the second user is distinct from the first user;
determining, using the one or more computing devices, the availability of the digital content and the attribution information based on a difference between the second time and the first time with respect to the first user-defined fading time indication, and the at least one user-defined category; and
automatically providing for display to the second user, using the one or more computing devices, the available digital content for the at least one user-defined category without providing the attribution information of the first user that is associated with the digital content for the at least one user-defined category, so as to make authorship of the digital content anonymous to the second user.

9. The non-transitory computer readable medium of claim 8, wherein the time period comprises one of an amount of time after the determination of the first user-defined fading time indication by the first user, and an amount of time after the posting of the digital content by the first user at the first time.

10. The non-transitory computer readable medium of claim 9, wherein the first user determines the time period and a type of the automatic fading for a content category to which the posted digital content belongs.

11. The non-transitory computer readable medium of claim 9, further comprising providing the first user with an option to set the first determination, a second determination that the attribution information is not available to the second user, and a third determination that the attribution information of the first user to the digital content is available to only a circle of users that includes the second user.

12. The non-transitory computer readable medium of claim 8, further comprising generating a display to the user that prompts the first user to confirm the determined availability of the digital content in response to a request received from the second user for the display of the digital content, after posting of the digital content, while maintaining the authorship of the digital content as anonymous.

13. The non-transitory computer readable medium of claim 8, wherein the online user content is categorized based on at least one of a recommendation, a post, a comment, a video, data associated with an online application, an image, and a video.

14. The non-transitory computer readable medium of claim 8, wherein the first user-defined fading time indication is determined by the first user one of concurrently with and after the posting of the digital content.

15. One or more computing devices comprising storage and a processor configured to perform:
receiving, using one or more computing devices, digital content from a first user, wherein the digital content received from the first user is associated with a first user-defined fading time indication to fade attribution information associated with the digital content and not fade the digital content, and at least one user-defined category;
posting, using the one or more computing devices, the digital content and the attribution information at a first time;
associating, using the one or more computing devices, the first user-defined fading time indication with the attribution information, wherein the associating comprises storing the first user-defined fading time indication including a time period and a first determination that the digital content available to a second user does not include the attribution information of the first user to the digital content so as to make authorship of the digital content anonymous to the second user;
receiving, using the one or more computing devices, at a second time, from the second user, a request to view the digital content, wherein the second time is after the first time, and
wherein the second user is distinct from the first user;
determining, using the one or more computing devices, the availability of the digital content and the attribution information based on a difference between the second time and the first time with respect to the first user-defined fading time indication, and the at least one user-defined category; and
automatically providing for display to the second user, using the one or more computing devices, the available digital content for the at least one user-defined category without providing the attribution information of the first user that is associated with the digital content for the at least one user-defined category, so as to make authorship of the digital content anonymous to the second user.

16. The one or more computing devices of claim 15, wherein the time period comprises one of an amount of time after the determination of the first user-defined fading time indication by the first user, and an amount of time after the posting of the digital content by the first user at the first time.

17. The one or more computing devices of claim 16, wherein the first user determines the time period and a type of the automatic fading for a content category to which the posted digital content belongs.

18. The one or more computing devices of claim 16, wherein further comprising providing the first user with an option to set the first determination, a second determination that the attribution information is not available to the second user, and a third determination that the attribution information of the first user to the digital content is available to only a circle of users that includes the second user.

19. The one or more computing devices of claim 15, further comprising generating a display to the user that prompts the first user to confirm the determined availability of the digital content in response to a request received from the second user for the display of the digital content, after posting of the digital content, while maintaining the authorship of the digital content as anonymous.

20. The one or more computing devices of claim 15, wherein the first user-defined fading time indication is determined by the first user one of concurrently with and after the posting of the digital content.

* * * * *